UNITED STATES PATENT OFFICE.

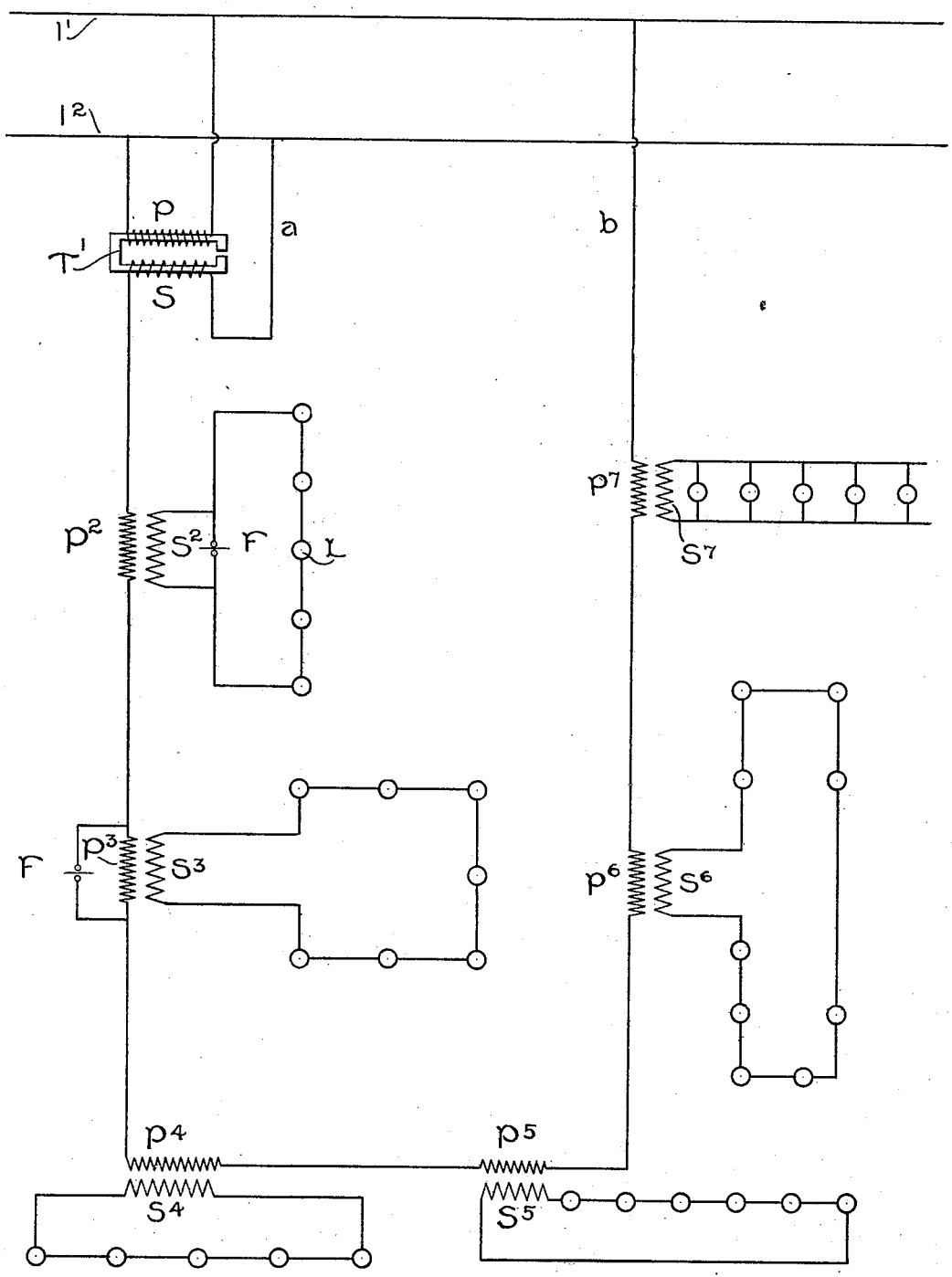

ELIHU THOMSON, OF SWAMPSCOTT, MASSACHUSETTS, ASSIGNOR TO THE GENERAL ELECTRIC COMPANY, OF NEW YORK.

SYSTEM OF DISTRIBUTION.

SPECIFICATION forming part of Letters Patent No. 654,367, dated July 24, 1900.

Original application filed September 10, 1897, Serial No. 651,212. Divided and this application filed May 18, 1899. Serial No. 717,261. (No model.)

*To all whom it may concern:*

Be it known that I, ELIHU THOMSON, a citizen of the United States, residing at Swampscott, county of Essex, State of Massachusetts, have invented certain new and useful Improvements in Systems of Distribution, (Case No. 1,276,) of which the following is a specification.

This application is a division of my former application, Serial No. 651,212, filed September 10, 1897. My former application, generally speaking, relates to circuits fed by a combination of constant-current and constant-potential transformers. The claims of the present application are more generic in character and cover a circuit fed conjointly from a constant-current transformer and a source of constant electromotive force which may or may not consist of a constant-potential-transformer secondary. As regards this feature, the present application is to be regarded as the broad case and is not to be considered as limited to the precise apparatus shown for purposes of illustration.

In supplying a circuit from the secondary of a constant-current transformer and from a source of constant electromotive force several important results are obtained. The regulating action of the constant-current transformer acts to maintain a constant current in the circuit, and this action takes place so long as the load on the circuit is such as to require an electromotive force greater than that represented by the source of constant electromotive force. Under these circumstances the load on the circuit can never be reduced to zero, but only to a minimum represented by the electromotive force of the constant-potential source. This condition of affairs is, however, no substantial disadvantage in practice. By employing this method of feeding a constant-current circuit a much higher power factor is obtained than would be the case if the total electromotive force were derived from the secondary of a constant-current transformer of a size large enough to generate the additional electromotive force which according to my invention is supplied from a constant-potential source. A constant-current transformer of such increased capacity seriously reduces the power factor of the line when operating at light loads, while according to my invention the constant-current transformer employed does not begin to reduce the power factor of the line to any appreciable extent until the electromotive force in circuit is greater than that of the constant-potential source.

My invention will be more clearly apprehended by reference to the accompanying drawing, while its scope will be indicated in the claims appended hereto.

In the drawing, $l'$ and $l^2$ represent constant-potential alternating-current mains fed from any suitable source of energy. The primary P of the constant-current transformer $T'$ is connected directly across these mains, while its secondary (indicated at S) is included in series with a separate circuit the leads of which $a\ b$ are also connected across the supply-mains $l'\ l^2$. The circuit $a\ b$ is arranged to supply translating devices in series, and in the drawing I have for purposes of illustration shown these devices as transformers into the secondaries of which are connected other translating devices—such as incandescent lamps, arc-lights, or the like. It is obvious, however, that instead of these transformers in the circuit $a$ and $b$ any other form of translating device may be employed.

The transformers of the circuit $a$ and $b$ are indicated at $P^2$ to $P^7$, while their secondaries are shown, respectively, at $S^2$ to $S^7$. These transformer-secondaries may supply translating devices arranged either in series or in parallel, as may be desired. The secondary $S^7$ is shown as supplying lamps in parallel to each other, while the other secondaries $S^2$ to $S^6$ supply lamps or other translating devices in series.

Film cut-outs F or other safety devices may be provided in connection with the primaries or secondaries of the transformers in order to protect the line in case of accidental opening of any of the subcircuits. In case of accidental rupture of a subcircuit the film cut-out will be punctured, if properly proportioned, and thus act as a shunt, so as to permit the working of the remaining load.

What I claim as new, and desire to secure by Letters Patent of the United States, is—

1. The combination with constant-potential mains, of a circuit connected across the same and including in series therewith the secondary of a constant-current transformer the primary of which is also connected across the said mains.

2. The combination with constant-potential mains, of translating devices in a circuit across said mains, and a constant-current transformer with its secondary in said circuit and its primary connected across said mains.

3. The combination of a circuit fed from a source of constant electromotive force and a device in said circuit fed also from said source giving rise to an electromotive force which varies inversely with the current in the circuit.

4. The combination of a circuit fed from a source of constant electromotive force and a device in said circuit fed also from said source giving rise to an electromotive force which automatically varies inversely with the current in the circuit.

5. In a series system of distribution, the combination of a series circuit including therein a plurality of transformer-windings, and film cut-outs arranged in shunt to said windings.

6. In a series system of distribution, the combination of a circuit including therein a plurality of translating devices, film cut-outs in shunt to said translating devices and means for causing a constant current to flow in said circuit.

In witness whereof I have hereunto set my hand this 15th day of May, 1899.

ELIHU THOMSON.

Witnesses:
DUGALD McKILLOP,
HENRY O. WESTENDARP.